Patented May 20, 1941

2,242,211

UNITED STATES PATENT OFFICE 2,242,211

QUATERNARY COMPOUNDS OF THE PYRIDINE SERIES AND PROCESS FOR THE PRODUCTION OF THE SAME

Erich Haack, Radebeul, near Dresden, Germany, assignor to Chemische Fabrik Von Heyden Aktiengesellschaft, Radebeul, near Dresden, Germany, a corporation of Germany No Drawing. Application July 20, 1938, Serial No. 220,347. In Germany August 2, 1937

2 Claims. (Cl. 260—286)

The present invention relates to new quaternary compounds of the pyridine-series which are valuable for different purposes, especially as emulsifying and wetting agents and in tinctorial processes and have a strong disinfecting power.

According to the present invention it has been especially found that valuable quaternary addition products of alcohol compounds of the formula R—CO—NH—A—OH to pyridine, chinoline and isochinoline are obtained by reacting these compounds together with approximately 1 mol of halogen hydride at elevated temperature. R represents an alkyl-, aryl- or aralkyl-group, consisting of at least 7 C-atoms, A represents an alkylene-radical containing more than one carbon atom, e. g. the ethylene-group, and —CO—NH— represents the radical of an acid amide, linked to the alkylene radical A by means of the nitrogen atom. The hydroxy compound R—CO—NH—A—OH may thus present for instance the following types of compounds: acyl-compounds of aminoalcanols, e. g. monoethanolamide of a fatty or aryl-fatty acid or the corresponding monopropanol- or monobutanol-amides.

These hydroxy compounds, when in presence of halogen hydride and at elevated temperature, react with pyridine, chinoline, isochinoline and their substitution products, e. g. the alkyl-pyridines and -chinolines, one mol of water being split off and quaternary pyridinium-, chinolinium- and isochinolinium halides being formed, which have the radical R—CO—NH—A— linked to the ring nitrogen.

Preferably, the amount of the halogen hydride ought not to be essentially larger than the equimolecular quantity of the tertiary pyridine base. On the other hand, it may occasionally serve the purpose of accelerating the reaction or obtaining a homogeneous solution, if an excess of the pyridine base is used. The proportion of the alcohol and the halogen hydride may be the theoretical molar proportion of 1:1 or more or less. As to the most favorable temperature, it depends on the alcohol used and the halogen elected. Hydrobromic acid, in many a case reacts better than hydrochlorid acid, a lower temperature then being required. Preferably one should not go beyond that temperature, at which the quaternary compound or the hydroxy-compound decomposes, e. g. in forming olefines. This temperature of decomposition depends on the constitution and the molecular weight of the compound

R—CO—NH—A—OH

The higher members often decompose more readily than the lower ones. The temperatures practically to be applied lie between 50 and 200° C. The reaction generally takes place without a solvent being present. If a solvent should be necessary, one of the reaction components itself is used best for this purpose. If other solvents are to be used, they must be free from alcoholic hydroxy groups, in order to keep them from reacting upon the pyridinium halide.

By means of the present process, starting from easily accessible and inexpensive compounds, one may in a simple way obtain water soluble quaternary pyridinium compounds, which may be used for many different purposes, e.g. as wetting, equalizing, emulsifying agent, for improving the fastness of dyes against water and for other textile purposes, as well as for disinfecting purposes. It is surprising and was not to be foreseen by known facts, that the process may be performed so easily, since a saponification of the amide- or of the ether-linking was to be expected under the reaction conditions: high temperature, strongly acid reagent, formation of water. Over other methods for the production of similar compounds starting from higher alkyl halides or from higher fatty alcohols, the present process has the great advantage that the primary materials, e. g. the acyl aminoethanols, are easily accessible and inexpensive compounds, which unlike the fatty alcohols must not first be produced by hydrogenation of fatty acids or like the alkyl halides by hydrogenation followed by a treatment with halogenating agents.

Example 1

500 g. of monoethanolamide of lauric acid, made by boiling methyl laurate with ethanolamine until the methanol is completely split off and recrystallizing from methanol, are shaken with 330 g. of pyridine hydrobromide at 100° C. for about 40 hours. The reaction is complete as soon as the greatest part of the mass is soluble in water and not precipitated by adding sodium carbonate solution. For the production of a 10% solution, the reaction product is dissolved in water to give a solution of about 5% and after standing in the cold for a few hours, separated from the undissolved part. After adding the amount of sodium carbonate required to set the excess of pyridine free, the solution is evaporated in vacuo so as to give a 10% solution, the excess of pyridine then being expelled.

In place of pyridine, one may also use for instance α- or β-picoline or isochinoline, similar compounds then being obtained. Other ethanolamides, like caprylic, capric or stearic derivates, also act in the same way as lauric acid ethanolamide.

*Example 2*

500 g. of a fatty acid ethanolamide, obtained by reaction of split cocoa-nut-oil (containing all the natural acids, beginning with the caprylic up to the stearic acid, and some oleic acid) with monoethanolamine, 330 g. hydrochloride of a fraction of pyridine bases (50% distilling up to 140° C., 90% distilling up to 160°, completely soluble in water) and 100 g. of the mixture of the free pyridine bases are heated at 100° C. until the product is, for the most part, soluble in water and stable towards diluted sodium carbonate solution. After being separated from the primary compounds not reacted upon, the mixture of pyridinium-, picolinium- and other homologous pyridinium compounds obtained may be further worked up to form a 10% watery solution.

When working at 150–160°, the reaction is more rapid.

Furthermore, pure pyridine may be used instead of a mixture of pyridine bases, the finished product thereby assuming a greater stability towards alkali.

What I claim is:

1. The compound of the formula

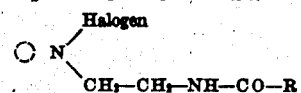

where CO—R means an acyl radical selected from the group consisting of the cocoanut-fatty acid acyl radicals,

means a heterocyclic compound of the pyridine series selected from the group consisting of pyridine, quinoline, isoquinoline and C-methylhomologues thereof.

2. Process for the production of quaternary addition products which consists in reacting upon hydroxy-compounds of the formula

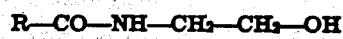

where CO—R means an acyl radical selected from the group consisting of the cocoanut-fatty acid acyl radicals, with a heterocyclic compound of the pyridine series selected from the group consisting of pyridine, quinoline, isoquinoline and C-methyl homologues thereof, in the presence of substantially 1 mol of halogen hydride at an elevated temperature, the heterocyclic compound being applied in an amount substantially equivalent to the halogen hydride.

ERICH HAACK.